United States Patent

[11] 3,584,436

[72] Inventor Stephen Gulyas
 Stowmarket, Suffolk, England
[21] Appl. No. 830,730
[22] Filed June 5, 1969
[45] Patented June 15, 1971
[73] Assignee The Lovenham Rug Company, Limited
 Suffolk, England
[32] Priority June 5, 1968
[33] Great Britain
[31] 26,777/68

[54] BLANKET
 7 Claims, 3 Drawing Figs.
[52] U.S. Cl. .................................................. 54/79
[51] Int. Cl. ............................................. A01k 29/00,
 A68c 05/00
[50] Field of Search ....................................... 54/79;
 119/143

[56] References Cited
UNITED STATES PATENTS

| | | | |
|---|---|---|---|
| 683,570 | 10/1901 | McWilliam | 54/79 |
| 1,239,478 | 9/1917 | Hanisch | 54/79 |
| 2,131,495 | 9/1938 | Allen | 54/79 |
| 3,466,852 | 9/1969 | Stoner | 54/79 X |

Primary Examiner—Hugh R. Chamblee
Attorney—Cushman, Darby & Cushman

ABSTRACT: A blanket for a horse comprising an outer layer of waterproof fabric, such as nylon; an inner layer of a material having a texture which is such as to cling to the animal's body, such as brushed nylon; and a padding of heat insulating fibre, such as polyester fibre, separating said two layers, the blanket being tailored to fit the animal.

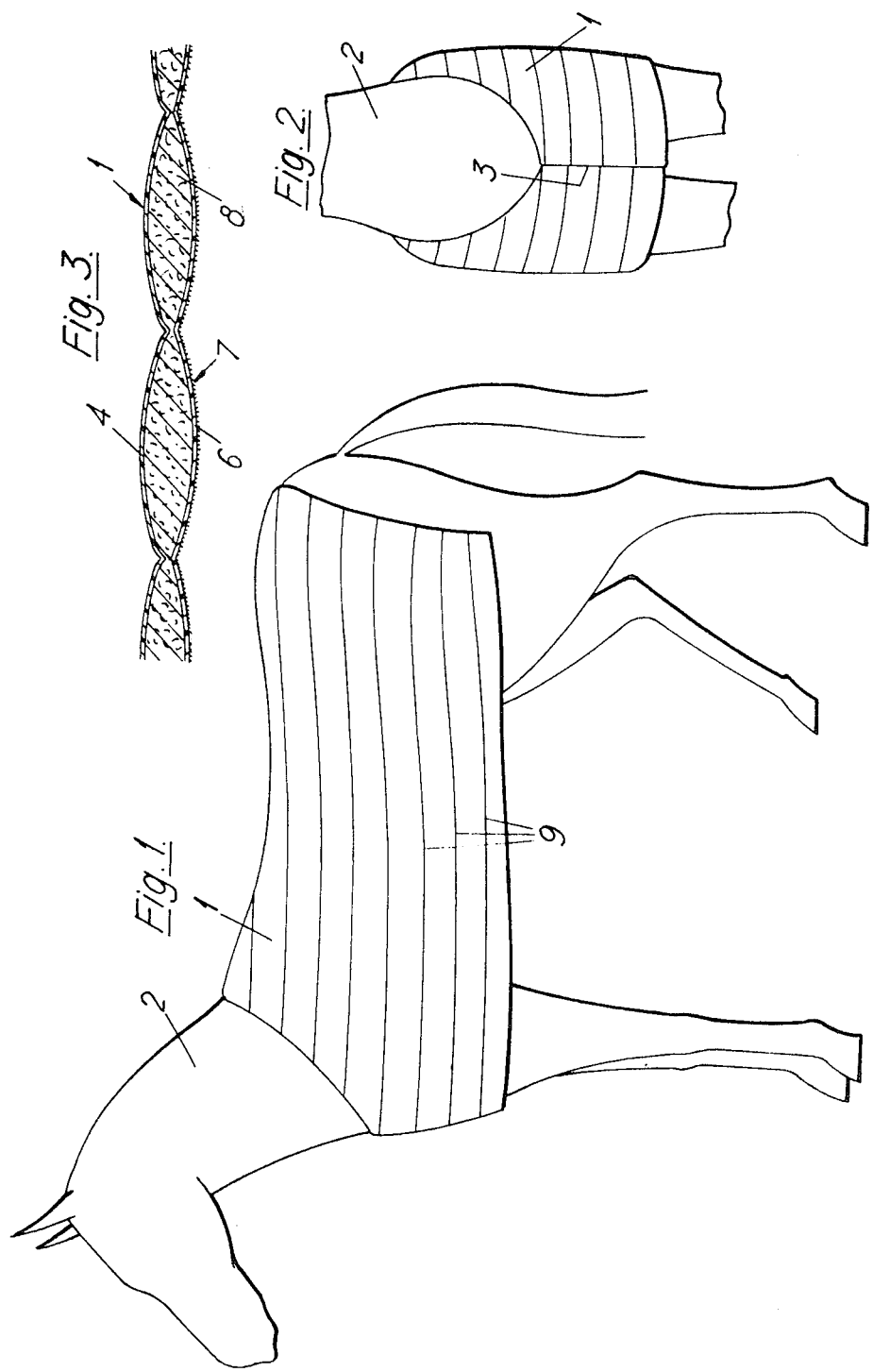

BLANKET

This invention relates to blankets for animals and, although not so restricted, will be described in relation to horse blankets.

According to the present invention there is provided a blanket for an animal comprising an outer layer of waterproof fabric, an inner layer of a material having outwardly directed fibers which, when the blanket is placed on an animal, intermingle with the animal's hair thereby causing the blanket to cling to the animal, and a padding of heat insulating fiber separating said two layers, the blanket being tailored to fit the animal.

The term "blanket" as used herein is intended to cover not only blankets but also rugs.

In the preferred embodiment the said outer layer is nylon. The padding may be polyester fiber.

The inner layer, outer layer and padding may be quilted together. Thus the inner layer, outer layer and padding may be stitched together.

In the embodiment of the invention illustrated, the blanket is tailored to fit a horse.

The invention is also directed to any novel feature or combination of features described herein and/or shown in the drawings.

The invention is illustrated, merely by way of example, in the accompanying drawings, in which:

FIG. 1 is a side view of a blanket according to the present invention in position on a horse, FIG. 2 is a front view of the blanket in position on a horse, and FIG. 3 is an enlarged section through part of a blanket according to the present invention.

The blanket 1 is shown in position on a horse 2. As can be seen from FIG. 2, the blanket 1 is drawn together at the front of the horse and held in position, at 3 by suitable means (not shown), but which may be straps or circingles or just the natural adherence of the fabric from which the blanket is made.

The blanket 1 is shown, in section, in FIG. 3, and comprises an outer layer 4, an inner layer 6 and a filling or padding 8, separating the inner and outer layers.

The outer layer 4 is waterproof and of a material such as, for example, 4 oz., nylon taffeta of industrial quality. This material is given a waterproof coating such as a spray coating of acrylic or polyurethane resin. The outer layer 4 could, in certain applications, be cotton duck i.e. a rubberized sailcloth material. The inner layer 6 is brushed nylon which may be stiffened chemically by, for instance, starch, if so required. It will be possible in certain circumstances to use a coarse wool material as an alternative to the brushed nylon. The padding 8 is heat insulating fiber such as polyester fiber and raw Terylene (Registered Trade Mark) of 3 oz., high loft has been found suitable. The inner layer 4, outer layer 6 and padding 8 are quilted together by stitches 9 although they could be heat moulded together.

At present a large number of different rugs or blankets are required for a single horse; examples are, turn out rugs, sleeping rugs, waterproof rain rugs, loose box rugs, sweat rugs, show rugs and New Zealand type rugs. To provide all these rugs for a horse is expensive, and they have the disadvantage that they are difficult to clean and often impossible to wash. Also they are prone to rotting due to dampness and bacteria resulting from the horse. Additionally, the horse often takes a dislike to these types of blankets due to their sheer bulk and weight and will try either to eat it or remove it by rolling over. If the blankets are kept on by a circingle or other type of fitting, sores may be produced especially when the horse tries to remove the blanket.

The blanket of the present invention alleviates these disadvantages. The waterproof outer layer 4 and the padding 8 keeps the horse both dry and warm. It also allows the horse to sweat freely since ventilation is still provided by the air in the padding. Thus the blanket will take the place of several of the blankets used for horses in the past. Since the blanket is made of synthetic material, then rotting due to dampness and bacteria is prevented, the blanket may be washed, and the horse will dislike eating it.

The brushed nylon inner layer 6 has outwardly directed fibers which intermingle with the horse's hair thereby causing the blanket to cling to the back of the horse and thus it is not absolutely necessary to provide circingles and other fastening to keep the blanket on the horse. The blanket has the added advantage over previous fiber that by keeping layers, horse warm it has been found that the horse may require less food. The blanket may, apart from being used on horses, be used on any animal whether domesticated or wild.

I claim:

1. A blanket for an animal comprising, an outer layer of waterproof fabric, an inner layer of a material which is produced to have outwardly directed fibers which, when the blanket is placed on an animal, intermingle with the animal's hair thereby causing the blanket to cling to the animal, and a padding of heat insulating fiber separating said two layers, the blanket being tailored to fit the animal.

2. A blanket as claimed in claim 1 in which the outer layer is nylon.

3. A blanket as claimed in claim 1 in which said inner layer is brushed nylon.

4. A blanket as claimed in claim 1 in which the padding is polyester fiber.

5. A blanket as claimed in claim 1 in which the inner layer, outer layer and padding are quilted together.

6. A blanket as claimed in claim 5 in which the inner layer, outer layer and padding are stitched together.

7. A blanket as claimed in claim 1 in which said blanket is tailored to fit a horse.